Nov. 22, 1960 L. S. CUTLER ET AL Re. 24,896

PRECISION SELECTIVE-RATIO TRANSFORMER

Original Filed July 26, 1955

INVENTORS
Leonard S. Cutler and
Robert J. Rorden,

BY Homer R. Montague
ATTORNEY

United States Patent Office

Re. 24,896
Reissued Nov. 22, 1960

24,896

PRECISION SELECTIVE-RATIO TRANSFORMER

Leonard S. Cutler and Robert J. Rorden, Palo Alto, Calif., assignors to Gertsch Products, Inc., a corporation of California Original No. 2,832,036, dated Apr. 22, 1958, Ser. No. 524,544, July 26, 1955. Application for reissue Sept. 28, 1959, Ser. No. 843,028

8 Claims. (Cl. 323—47)

Matter enclosed in heavy brackets [ ] appears in the original patent but forms no part of this reissue specification; matter printed in italics indicates the additions made by reissue.

This invention pertains to electrical transformers, and particularly to a special form of transformer whose input-output voltage ratio can be adjusted at will to any of a large number of values, to provide a selected ratio whose value will be precisely known. Transformers of this type have wide utility in the field of electrical measurements and for other purposes.

Transformers in which the voltage ratio can be selected from a number of different values are of course well known in the art. They are used, for example, where equipment must be connected at different times to alternating current supplies having different voltage values. However, in many cases, the actual voltage ratio is not a matter of great interest since the equipment will always have a certain tolerance for voltages differing from the normal value. The present invention is not concerned with transformers of this type, nor with power transformers generally. On the contrary, transformers of the type with which the invention is concerned are intended exclusively for very precise measuring, computing or control functions. In such cases, the transformation ratio of the transformers must be known with a precision at least equal to the accuracy of the voltages being transformed. While it is possible to wind a transformer for a particular application so as to have practically exact precision in the turns ratio, and hence in the voltage ratio, for many purposes it is desirable to be able to select this transformation ratio in accordance with a particular purpose or problem. For greatest utility, also, it would be desirable for one to be able to adjust the transformer ratio by means of switches or the like without introducing significant error in the ratio.

Efforts have been made to design adjustable transformers for precise purposes, for example by providing an autotransformer having a large number of turns, together with a switch arrangement so that any desired turns or group of turns could be included between the output terminals. By utilizing one switch to select as between a group of single turns, a second switch for selecting as between groups of 10 turns, and so on, it is feasible to construct a transformer in which each switch controls one decade, so that the switch positions can be utilized to give a direct indication of the digits making up the total expression for the transformer ratio. For great precision, however, this system required a transformer having no fewer turns than the largest number which can be expressed by the significant digits in the transformer ratio range; for example, a transformer of this type giving a precision within one part in a thousand would have to have at least a thousand turns. It is readily seen that since the number of turns would be multiplied by 10 for each additional decade, a limit is soon reached at which a compact or portable unit is out of the question.

It has also been proposed to construct a precision adjustable transformer of this general type in which the actual windings are switched in decade fashion. Thus, such a unit might include a set of single-turn windings which could be inserted in series at any point in a set of 10-turn windings which could in turn be inserted at any point in a set of 100-turn windings. For a decade arrangement (the base of the system being 10 digits per order) this effects a substantial reduction in the number of turns required for a given order of precision. However, because of the requirement that each lower-order decade must be inserted at a particular point in the windings constituting the next higher decade, the switch must be arranged so that all of the windings in one decade pass through switch contacts, in order that each decade may be broken at the appropriate points for the insertion of the windings constituting the following decade. Inasmuch as this large number of contacts would introduce errors due top their non-uniformity, especially with varying transformer loads, devices of this type have not been wholly satisfactory.

It is accordingly a principal object of the present invention to provide a readily adjustable transformer of the decade switching type in which the selection of the desired ratio can be readily accomplished with relatively simple switches and without impairing the accuracy of the selected transformation ratio. Broadly, the invention utilizes a shunt-connected circuit between successive decades, so that it is unnecessary to complete the circuit through all the windings by contacts individual to each digit within a decade.

A further object of the invention is to provide a transformer of this type in which rotary switches of relatively simple type can be used, and which in combination with suitable position indicators will give a direct reading of the precise transformation ratio for which the transformer is set.

Still another object of the invention is to provide a transformer of this type in which the undesirable effects of differential loading, non-distributed resistance and other defects of prior art transformers are reduced or eliminated.

In order to provide the last significant figure in the smallest of the decade orders, it has been proposed to utilize a potentiometer voltage divider for interpolation between the individual steps provided by the decade windings of the last digit. By using a potentiometer having a large effective length, such as a 10-turn electrical potentiometer, two or more additional significant figures can readily be obtained without departing from the desired precision of the ratio. Since ordinarily the entire potentiometer will be inserted across a single turn of the transformer, an error will be present due to the fact that the loading due to the potentiometer will depend upon its setting and upon the magnitude of the load current which is drawn from the transformer. Also, it is difficult to make a potentiometer without end-resistance effects and the like which arise because the movable arm cannot usually be set to cause all of the voltage across the potentiometer to appear at its output terminals. The present invention provides increased accuracy when the transformer includes such an interpolation potentiometer.

For the sake of concreteness and ready understanding, the description above, and that which follows, refers to a "decade" arrangement of the windings and switches, this term implying that a numerical system using the base 10 is employed. Obviously the arrangement may utilize any numerical base desired without departing from the electrical principles involved.

The above and other objects of the invention will best be understood by referring now to the following specification of a preferred embodiment of the invention, given by way of example and taken in connection with the appended drawings in which.

Figure 1:
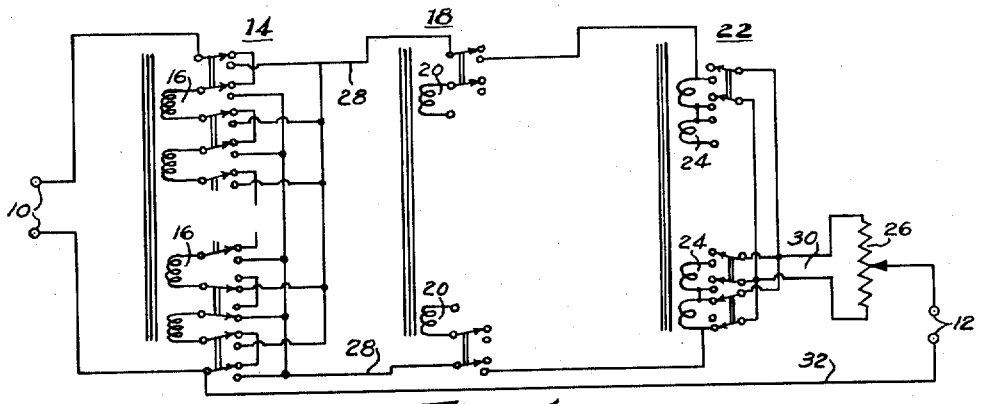
Fig. 1 is a schematic view of a prior transformer upon which the present invention is an improvement.

Fig. 1 illustrates a series-connected decade transformer of known type, numeral 10 designating the input terminals and numeral 12 the output terminals of the device as a whole. Since one input terminal and one output terminal are connected together, it will be obvious that the transformer is in fact an autotransformer in which the input voltage is applied across the entire group of windings forming the transformer, and the output voltage is derived from only certain of these windings. In the first decade, designated as a whole by reference numeral 14, there would be (in the example shown) nine identical windings 16, each of which might consist of one hundred turns. The second decade, designated 18, would also contain nine windings 20, each winding having ten turns. The third decade 22 would consist of ten windings 24, each having one turn. In Fig. 1, the windings constituting each decade are separated for clarity, but it will be understood that they are actually wound upon a common core constituting a closed magnetic circuit linking all of the turns and windings.

As illustrated, a switching arrangement is provided for decade 14 by which the group of windings constituting that decade may be broken to allow the insertion between any two of the windings 16 the entire group of windings constituting the next decade 18. Likewise, by similar switches, the entire group of windings constituting decade 22 can be inserted in series between any two of the windings constituting decade 18. Finally, a potentiometer 26 is provided which may be connected across any one of the single turn windings 24 constituting the decade 22. The push buttons of this latter decade are arranged to connect the potentiometer across any selected one of the ten windings 24.

The above arrangement requires that the switch for decade 14 must be such that the decade can be interrupted between any two of its windings 16, while at all other contacts of that decade a complete series circuit must be established from one input terminal 10 through the windings to the other input terminal. Such a switching arrangement for example could comprise (as shown) ten push buttons interlocked so that when any button is depressed, it opens the circuit between two adjacent windings 16 and releases all the other buttons of that decade so that all other adjacent windings 16 are connected in series. Also, the selected push button which is depressed must connect the terminals between the selected pair of adjacent windings 16 to the leads 28 extending to the next decade 18. Such a switching arrangement is partially indicated for the first and last two windings of decade 14, and the manner in which this arrangement is provided for each of the windings of such decade will be obvious to those skilled in electrical circuits. The switching arrangement for decade 18 is identical.

From an inspection of Fig. 1, it is apparent that the input voltage at terminals 10, regardless of which switch in each decade is operated, is applied across a series circuit involving all of the windings of all of the decades. Since there are total of nine hundred turns in decade 14, a total of ninety turns in decade 18, and a total of ten turns in decade 22, this input voltage is in fact applied across a total of one thousand turns. Therefore, the voltage across any single turn will be $1/1000$ of the input voltage. This is the voltage which will be applied across leads 30 and therefore across the potentiometer 26, whose sliding contact forms one of the output terminals 12 of the entire device. If the push buttons of each decade are numbered from zero to nine, reading from bottom to top, and the respective push buttons which are depressed in each decade are designated X, Y, Z respectively, it is clear that the voltage between lead 32 (which is common to the input and output) and the lower end of potentiometer winding 26 will be 0.XYZ times the input voltage across terminals 10. At the output terminals 12, the voltage will be that which was just expressed plus a decimal fraction equal to 0.001 times the percentage of potentiometer winding 26 picked off by the sliding arm. The indicator knob of the potentiometer can readily be calibrated to indicated the remaining significant figures of the ratio.

The arrangement just described is preferably feasible, but has several undesirable features which will be apparent from an inspection of the diagram. Thus, for example, the current passing through all of the windings is carried by the switch contacts connecting these windings; thus, it must pass through something like two contacts per winding in each of decades 14 and 18, and any variation in the resistance of these contacts when closed will be reflected as an inaccuracy in the final output voltage. Also, by operating two push buttons simultaneously in one decade, a short circuit can readily be produced across the corresponding windings, with possibility of damage either to the contacts or the transformer. The same result can occur with any feasible push button construction, when a button is pushed rapidly enough to complete its operation before a previously pushed button has been released by the interlocking mechanism. Furthermore, since the current in the transformer passes through switch contacts and their connecting leads at every winding, the inductance and resistance of these leads and contacts effect a substantial contribution over that which would be produced by the transformer windings themselves. Finally, the potentiometer 26 adds a substantial series component to the effective output impedance of the total device, besides the errors due to its own non-linearity and the loading effect which produces some voltage drop in the single turn of decade 22 across which it is connected. The present invention constitutes an improvement over the general approach which has been described in that successive decades are not connected in series relationship, but in shunt or parallel relationship. This requires a different arrangement of the windings and permits a much simpler switching system employing rotary switches and eliminating the need for any interlock such as is used with the push button described. At the same time, this shunt arrangement makes it feasible to replace the multi-turn potentiometer 26 with a further decade or decades of transformer windings, whereby the difficulties produced by the potentiometer are reduced to a negligible factor.

Figure 2:
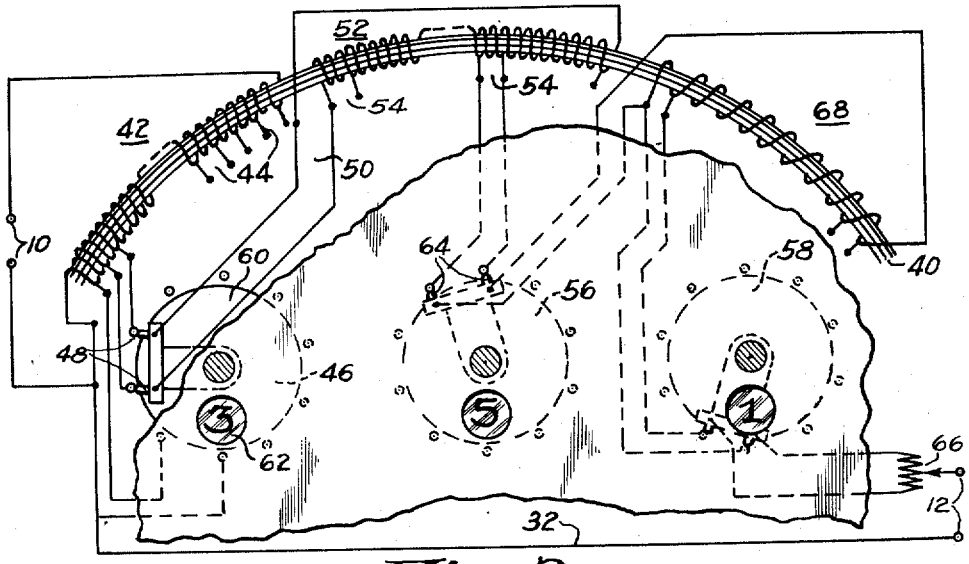
Fig. 2 is a diagram, partly schematic, showing a preferred form of transformer in accordance with the present invention.

For ease of understanding the novel features of the present invention, it will also be described in connection with a specific arrangement, after which various modications will be elaborated in connection with a generalized description of the design parameters. Referring now to Fig. 2 of the drawings, there is shown a three-decade transformer in accordance with the invention, all of the windings being linked by a common magnetic circuit or core 40, which may be a toroidal core of magnetic material chosen in accordance with the frequencies of the alternating currents with which the transformer is intended to be used. The first decade 42 constitutes a group of ten windings 44 each consisting of one hundred turns, the input terminals 10 being connected across the entire decade. It will be noted that this decade may be constituted by a single continuous winding of one thousand turns, tapped at ten equally spaced positions; thus, the construction of the decade is much simpler than in the case already described in which the circuit between adjacent windings 16 had to be interrupted for the series insertion of the succeeding decade. As before, the lower input 10 is connected by a common lead 32 to one of the output terminals 12. Each of the tap points of the first decade is connected by a lead to one of ten equally spaced contacts of a rotary switch 46 whose wiper carries a pair of common contacts 48 so spaced that in any position of the switch they are bridged across a certain winding 44 of this decade. These two movable contacts are connected as by leads 50 across the entire winding of the second decade 52, which is constructed exactly like decade 42 except that there are ten groups of windings 54 of ten turns each. The terminals of these windings are connected to the ten equally spaced contacts of a second rotary switch 56, which is identical with switch 46. In the same way, the third decade, consisting of ten windings of one turn each, is selected by a similar rotary switch 58.

Since the rotary switches can occupy only one position at a time no special interlock is needed, and there is no possibility that any winding can be short-circuited even momentarily. Each switch is preferably provided with an indicator plate such as 60 bearing the equally spaced digits from zero to nine which are made visible in turn through a window 62. The ratio setting of the transformer will then be directly indicated by the digits appearing in proper order on the successive windows reading from left to right, as shown.

The mathematical basis for this shunt relationship of the successive decades is somewhat different from that of the embodiment earlier described. It will be observed that if the input voltage at terminals 10 is designated by E, then the voltage picked off by contacts 48 will be E/10. When the switch is set to connect the contacts 48 to the Ath winding 44 counting from the common lead 32, the voltage between this lead 32 and the lower-potential contact 48 will be E/10 times A. Since E/10 is applied across decade 52, the voltage between the movable contacts 64 of the second decade switch 56 will be E/100, and the voltage between common lead 32 and the lower potential contact of the pair 64 will be E/10 times A plus E/100 times B, where switch 56 is connected to the Bth winding of decade 52. Thus, the final voltage at the lower end of potentiometer 66 with respect to the lower output terminal 12 will be the sum of the voltages picked off by the respective decade switches plus a contribution determined by the setting of the potentiometer which is in this case used only to obtain continuous resolution, as where it is necessary to match an unknown voltage for measurement purposes. Where an exact decimal ratio of division is desired, potentiometer 66 may readily be set to add a zero contribution to the output at terminals 12.

It is obvious that the above scheme can be extended to as many decades as are required, because each decade adds only two additional contacts to the circuit as compared with the addition of twenty contacts per decade (all in series) in the prior case. As will be described below, the additional decades may for reasons of mechanical convenience and [eas] *ease* of winding be common to a different core from the core 40 linking the first decades. Moreover, the input and output impedances are now substantially constant because the operation of the switches does not alter the number of windings in each decade which are connected to the input and output circuits.

Even within the limits of an arrangement utilizing a numerical base of ten, it is clear that the actual number of turns specified above may be varied. Thus, the decade 68 may consist of ten windings each having two turns or more, rather than one, so long as the windings within the decade are identical to one another, and the turns in the prior decades are multiplied accordingly. In addition, the transformer can readily be constructed for any desired numerical base other than ten, by providing for each decade the corresponding number of identical windings equal to the desired base. In the general case, the nth decade (reading from right to left in Fig. 2) will consist of M windings each having a number of turns equal to $M^{(n-1)} \times C$, where M is the numerical base of the system employed, and C is the number of turns per winding in the decade having the smallest number of turns.

Figure 3:
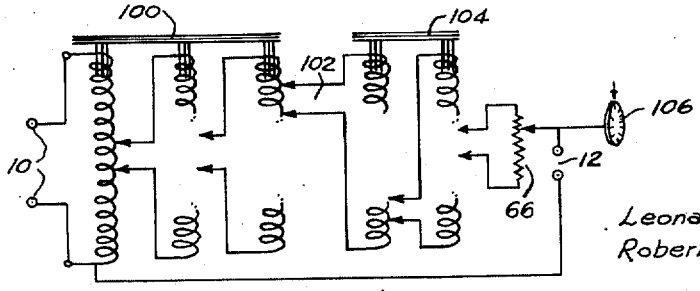
Fig. 3 is a view similar to Fig. 2, simplified as to detail and illustrating a more elaborate transformer in accordance with the invention.

The convenient extension of a transformer such as that just described to provide additional significant figures in the ratio established is illustrated in Fig. 3 of the drawings. In this figure, numeral 100 designates for example a three-decade transformer constructed as described in detail in connection with Fig. 2; its final decade switch contacts are connected to leads 102 which extend to the input terminals of a second transformer 104 also following the principles of Fig. 2. The two transformers may be constructed on separate cores as desired to simplify the winding problem and to provide a desired distribution of the cores and windings to permit all of the dials to be arranged in a single row for direct readings of the transformation ratio. Preferably, the potentiometer 66 will also be provided with a decimal indicating dial 106 so that the entire setting can readily be read off in proper numerical order. It is clear that the system as described can be further extended to any desired order of precision, the precision ultimate being determined by the accuracy with which the various windings can be produced.

From what has been said above, it will be understood that each of the successive transformation stages may have a number of windings other than 10, and that in fact any numerical base for the number system can be chosen. However, since the word "decade" has come to signify the arrangement of controls or selectors in stages not necessarily related by the base 10, this term is used herein, and in the following claims, without intending to limit the system to the base 10 implied by the etymology of the word "decade."

While the invention has been described above in connection with certain specific embodiments which have been illustrated for purposes of example and ready understanding, it will be understood that various modifications as to detail will occur to those skilled in the art, and certain of such modifications have been mentioned herein. The scope of the invention claimed is therefore not to be understood as limited by the scope of the illustrations and examples given, but only as defined in the appended claims.

What is claimed is:

1. A precision multiple selective ratio electrical transformer comprising a plurality of sets of windings, each set constituting a decade, the windings of each set being subdivided by connecting taps into a plurality of equal groups of turns, and the number of turns per group in successive decades being related by a simple whole number, a common magnetic core linking all of said windings, a selecting switch for each decade except the last wired to connect a selected group of turns of that decade across the entire set of windings forming the next decade, input terminals across the entire first decade, a selecting switch for the last decade, and a pair of output terminals of which one is connected to one of the input terminals and of which the other is wired through the last-named switch for connection to any selected winding of the last decade.

2. A precision multiple selective ratio electrical transformer in accordance with claim 1 in which all of said windings are wound upon a common magnetic core and an indicating dial for each of said switches, said dials being arranged to display their successive setting indications in alignment for direct reading of a multi-digit transformation ratio.

3. A precision multiple selctive ratio transformer having a first series-connected group of windings of a predetermined number of turns per winding, a pair of input terminals connected across said group, successive other groups of the same number of series-connected windings as in said first series-connected group the number of turns per winding in each of which bears a predetermined relation to the said number of turns per winding in said first series-connected group, a common magnetic core linking all of said windings, means for connecting each of said successive groups in shunt with a selectable one of the windings of the next preceding group, a potentiometer, means connecting the resistance element of said potentiometer in shunt with a selectable one of the windings of the last of said successive groups, a pair of output terminals one of which is connected to one of said input terminals, means connecting the other of said output terminals to the tap element of said potentiometer, and indicating means, operated by each of said connecting means, bearing indicia corresponding to said predetermined relation.

4. A precision multiple selective ratio transformer having a first series-connected group of windings of a predetermined number of turns per winding, a pair of input terminals connected across said group, successive other groups of the same number of series-connected windings as in said first series-connected group the number of turns per winding in each of which bears a predetermined relation to the said number of turns per winding in said first series-connected group, a common magnetic core linking all of said windings, means for connecting each of said successive groups in shunt with a selectable one of the windings of the next preceding group, a pair of output terminals one of which is connected to one of said input terminals, means connecting the other of said output terminals to a selectable one of the windings of the last of said successive groups, and indicating means operated by each of said connecting means.

5. The invention in accordance with claim 4, wherein the number of turns per winding in the Nth group is equal to the number of turns per winding in the said first series-connected group multiplied by the (1—N)th power of the number of windings in each of said groups.

*6. A precision multiple selective ratio electrical transformer comprising a plurality of sets of windings, each set constituting a decade, the windings of each set being subdivided by connecting taps into a plurality of equal groups of turns, and the number of turns per group in successive decades being related by a simple whole number, a common magnetic core linking all of said windings, a selecting switch for each decade except the last wired to connect a selected portion of the turns of that decade to the entire set of windings forming the next decade, input terminals across the entire first decade, a selecting switch for the last decade, and a pair of output terminals of which one is connected to one of the input terminals and of which the other is wired through the last-named switch for connection to any selected winding of the last decade.*

*7. A precision multiple selective ratio electrical transformer comprising a plurality of sets of windings, each set constituting a decade, the windings of each set being subdivided by connecting taps into a plurality of equal groups of turns, and the number of turns per group in successive decades being related by a simple whole number, means including magnetic core structure for linking all of said windings with an identical magnetic flux, a selecting switch for each decade except the last wired to connect a selected group of turns of that decade across the entire set of windings forming the next decade, input terminals across the entire first decade, a selecting switch for the last decade, and a pair of output terminals of which one is connected to one of the input terminals and of which the other is wired through the last-named switch for connection to any selected winding of the last decade.*

*8. A precision multiple selective ratio electrical transformer comprising a plurality of sets of windings, each set constituting a decade, the windings of each set being subdivided by connecting taps into a plurality of equal groups of turns, and the number of turns per group in successive decades being related by a simple whole number, means including magnetic core structure for linking all of said windings with an identical magnetic flux, a selecting switch for each decade except the last wired to connect a selected portion of the turns of that decade to the entire set of windings forming the next decade, input terminals across the entire first decade, a selecting switch for the last decade, and a pair of output terminals of which one is connected to one of the input terminals and of which the other is wired through the last-named switch for connection to any selected winding of the last decade.*

References Cited in the file of this patent or the original patent

UNITED STATES PATENTS

| | | |
|---|---|---|
| 1,422,653 | Berry | July 11, 1922 |
| 2,572,545 | Walker | Oct. 23, 1951 |